Patented Oct. 20, 1931

1,828,365

UNITED STATES PATENT OFFICE

HARVEY D. GEYER, ARTHUR H. FLOWER, AND JACOB C. HOUSEKEEPER, OF DAYTON, OHIO, ASSIGNORS TO THE INLAND MANUFACTURING COMPANY, OF DAYTON, OHIO, A CORPORATION OF DELAWARE

HEAT INSULATING MATERIAL

No Drawing. Application filed May 21, 1929. Serial No. 364,936.

This invention relates to an improved heat insulating material composed largely of shredded particles of highly blown vulcanized rubber compound, and the method of making the same.

An object of the invention is to provide an efficient and economically made heat insulating material which will be entirely water-resisting which will not rot and cause bad odors in the presence of moisture, and which is especially adapted for use in the walls of refrigerators and the like.

Another object is to provide a simple and efficient method of making uniform shapes or slabs of heat insulation material from highly blown vulcanized cellular rubber compound.

Further objects of the invention will become apparent from the following detailed description of the preferred form of practicing this invention at the present time.

Attempts have been made to make and use slabs of blown or cellular hard rubber compound as a substitute for the well known cork board heat insulation. Heretofore, so far as known, all such attempts have produced a cellular material which has a much greater specific gravity than cork-board and hence such attempts have not been commercially successful due chiefly to the objectionable heavy weight of the insulating material and the resulting high cost thereof.

By this present invention a suitable uncured rubber compound is first provided which is capable of an exceedingly high "blow" (increase in volume due to formation of gas cells therein) during vulcanization due to the gasifying of the blowing agent which is compounded therein. Blowing agents are well known to rubber compounding experts and need not be specified herein. Such excessive blowing of vulcanized rubber compounds has not been heretofore deemed of any commercial value due to the impossibility of controlling the final shape and size of the hard vulcanized blown rubber piece. The greater the degree of blowing or the increase in volume of the material during vulcanization, the greater will be the distortion and irregularity in shape of the final hard vulcanized piece of material. In the method of this invention the distortion or irregularity of shape of the highly blown vulcanized hard rubber is not objectionable and no attempt is made to control same, since by permitting free expansion on all sides of the piece during vulcanization a greater blow may be obtained without difficulty. Then the highly irregular and non-uniform slabs or pieces of vulcanized cellular hard or stiff rubber compound are broken up into relatively small irregular particles by means of a suitable shredding device. After shredding, this broken material is treated with a suitable binder, such as a molten bituminous binder having a melting point around 200° F., and the mass of heated blown rubber particles and binder is shaped up to the desired slab or other form in shaping molds and permitted to set and harden.

Preferably some sort of outer surface covering is provided on the top and bottom sides of the formed slabs to give the following advantages: the molded slab may be more easily freed from the shaping mold; a smoother and more water-proof surface is provided on the slab; the slab may be more conveniently handled and more accurately cut and fitted in place when used to cover heat-insulating walls in the manner that slabs of cork-board are ordinarily used. For such surface covering a heavy paper previously coated on one side with an asphalt material may be used, this paper being preferably laid in the shaping mold cavity with the coated side thereof faced toward the cellular material to be molded and thus caused to adhere firmly to the molded slab of cellular material when removed from the shaping mold. Instead of paper, the shaped slabs may be coated with a thin coating of rubber latex composition, or rubber latex and casein glue cement, or bakelite cement, or rubber cement, by any suitable means which will be obvious to those skilled in the art, such as by spraying such fluid substances upon the formed slabs and drying or hardening such coating.

As a typical example of a high-blowing rubber compound which may be satisfactorily used with the method of this invention as above described, the following is given:

Material

| | Weight-lbs. |
|---|---|
| Auto tire tube reclaim | 10.00 |
| Blown asphalt | 3.50 |
| Sulphur | 4.00 |
| Zinc oxide | 0.50 |
| Diatomaceous earth | 4.10 |
| Magnesium carbonate | 1.50 |
| Water | 1.00 |
| Magnesium chloride | 0.75 |
| Petrolatum | 1.05 |
| Sodium bicarbonate | 1.25 |
| Diphenyl guanidine | 0.15 |
| | 27.80 |

This compound may be mixed on an ordinary rubber mixing mill or in a Banbury type mixer to form a batch of uncured stock which is preferably first aged for 24 hours prior to vulcanizing in an open steam vulcanizer for two hours at fifty pounds of steam pressure, or 298° F. The rubber compound to be used with this invention is preferably chosen to give maximum blow or cellular structure together with stiffness of structure without any attempt to control the shape or size of the vulcanized pieces. These vulcanized pieces are then broken or otherwise divided into small particles which may vary considerably in size, though preferably these particles should range from five to ten cu. centimeters each and with the least amount of pulverization possible.

A bituminous binder is preferably used as the adhesive means for the cellular rubber particles. This binder may be added to the shredded rubber particles in a molten condition and sprayed thereon with a heated spray gun, or by any other suitable means which may be readily devised. A bituminous material which has been found very satisfactory for this use is medium paralite having the following physical characteristics:

Melting pt. (ball and ring method)—190–200° F.
Penetration at 32° F.—not less than 6.
Penetration at 77° F.—11 to 15.
Penetration at 115° F.—not more than 30.
Specific gravity at 60° F.—not less than 1.00.
Flash pt.—not less than 450° F.
Solubility in C S$_2$—not less than 99%.
5-hr. loss at 325° F.—not more than 0.2%.

The above special type of material is not necessary, as many other types of bituminous binders can be used, an important requisite being that the binder should not be brittle when cold.

The mass of shredded cellular rubber after being treated with the binder should be warmed before it is inserted into shaping molds in order to render the binder more fluid and give a certain amount of plasticity to the mass to facilitate the proper filling of the shaping molds. An ordinary size of such molded slab is 2½ inches by 24 inches by 24 inches. The slab is preferably allowed to cool within the shaping mold but without pressure thereupon.

While the form of embodiment of the present invention as herein disclosed, constitutes a preferred form, it is to be understood that other forms might be adopted, all coming within the scope of the claims which follow.

What is claimed is as follows:

1. The steps in the method of making heat insulating material comprising: providing a cellular rubber composition structure, dividing said cellular structure into relatively small particles, and then binding said particles together with a suitable binder.

2. The steps in the method of making heat insulating material comprising: providing a cellular rubber composition structure, dividing said cellular structure into relatively small particles, applying a binding material to said particles and then shaping forms of insulating material from said cellular particles and applied binder.

3. The steps in the method of making heat insulating material comprising: providing a cellular rubber composition structure, dividing said cellular structure into relatively small particles, spraying said cellular particles with a suitable binder in fluid state, and then molding forms of insulating material from said cellular particles and applied binder.

4. The steps in the method of making heat insulating material comprising: providing a cellular rubber composition structure, dividing said cellular structure into relatively small particles, spraying said cellular particles with a molten binder to give an adhering plastic mass, and then shaping said mass to the desired form before said binder hardens.

5. The steps in the method of making heat insulating material comprising: providing irregular shaped pieces of highly blown vulcanized cellular rubber composition, dividing said irregular shaped pieces into relatively small particles, applying a fluid binding material to said particles to form an adhering mass, and then shaping said mass to the desired form and permitting said binder to harden.

6. The steps in the method of making heat insulating material comprising: providing irregular shaped pieces of highly blown vulcanized cellular rubber composition, shredding said blown rubber pieces into relatively small particles, applying a binding material to said particles, and then shaping the mass of said particles and binder into the desired form and permitting said binder to harden.

7. The steps in the method of making heat insulating material comprising: providing irregular shaped pieces of highly blown vulcanized cellular rubber composition, shredding said blown rubber pieces into relatively small particles, applying a molten bituminous binder to said particles, and then molding the resulting mass into desired forms.

8. The method of making heat insulating slabs, comprising: vulcanizing a rubber composition into a highly blown cellular structure without regard to the uniformity of the resulting shape or size of such cellular structure, dividing said cellular structure into relatively small particles, applying a binder material to said particles, and then shaping the mass of said particles and binder into the desired slab form and permitting said binder to harden.

9. The method of making heat insulating slabs, comprising: vulcanizing a rubber composition into a highly blown cellular structure without regard to the uniformity of the resulting shape or size of such cellular structure, dividing said cellular structure into relatively small particles, applying a molten bituminous binder to said particles to form an adhering mass, and then molding said mass into desired form in shaping molds and permitting the binder to set and harden.

10. As a new article of manufacture, heat insulating material comprising: shredded particles of highly blown vulcanized rubber compound held bound together with an adhering binder.

In testimony whereof we hereto affix our signatures.

HARVEY D. GEYER.
ARTHUR H. FLOWER.
JACOB C. HOUSEKEEPER.